United States Patent
Ulaganathan et al.

(10) Patent No.: US 10,283,163 B1
(45) Date of Patent: May 7, 2019

(54) METHOD AND SYSTEM FOR GENERATING VIDEO CONTENT BASED ON USER DATA

(71) Applicant: Wipro Limited, Bangalore (IN)

(72) Inventors: Sethuraman Ulaganathan, Tiruchirappali (IN); Manjunath Ramachandra, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/942,503

(22) Filed: Mar. 31, 2018

(30) Foreign Application Priority Data

Feb. 16, 2018 (IN) .............................. 201841006066

(51) Int. Cl.
| | | |
|---|---|---|
| *H04N 5/93* | (2006.01) | |
| *G11B 27/031* | (2006.01) | |
| *G11B 27/34* | (2006.01) | |
| *G06F 16/735* | (2019.01) | |
| *G06F 16/783* | (2019.01) | |

(52) U.S. Cl.
CPC .......... *G11B 27/031* (2013.01); *G06F 16/735* (2019.01); *G06F 16/783* (2019.01); *G11B 27/34* (2013.01)

(58) Field of Classification Search
CPC ..... G11B 27/031; G11B 27/34; G06F 16/735; G06F 16/783
USPC ....... 386/239, 278, 281, 241, 244, 245, 248, 386/326
See application file for complete search history.

(56) References Cited

U.S. PATENT DOCUMENTS

| | | | |
|---|---|---|---|
| 9,607,611 | B2 | 3/2017 | Dayan et al. |
| 10,055,898 | B1* | 8/2018 | Wang ...................... G06T 7/262 |
| 2007/0201558 | A1* | 8/2007 | Xu ..................... G06K 9/00765 |
| | | | 375/240.22 |
| 2007/0273696 | A1* | 11/2007 | Cheng ................ G06K 9/00771 |
| | | | 345/467 |
| 2010/0082345 | A1 | 4/2010 | Wang et al. |
| 2012/0177345 | A1 | 7/2012 | Trainer et al. |

\* cited by examiner

*Primary Examiner* — Robert Chevalier
(74) *Attorney, Agent, or Firm* — Pepper Hamilton LLP

(57) ABSTRACT

The present disclosure discloses method and video generation system for generating video content based on user data. The video generation system receives user data sequentially from user, where each sequence of user data is converted into text data. One or more objects, relations, emotions, and actions from user data is identified by evaluating text data, a scene descriptor is generated for each sequence of user data, by associating one or more objects with one or more relations, emotions, and actions. The method comprises performing consistency check for scene descriptor of each sequence of user data, based on one or more previously stored scene descriptors, performing, one or more modifications to inconsistent scene descriptors, identified based on consistency check, generating, segments for each of scene descriptor and generating video content for by combining video segments associated with each of scene descriptor.

18 Claims, 7 Drawing Sheets

METHOD AND SYSTEM FOR GENERATING VIDEO CONTENT BASED ON USER DATA

This application claims the benefit of Indian Patent Application Ser. No. 201841006066, filed Feb. 16, 2018, which is hereby incorporated by reference in its entirety.

FIELD

The present subject matter is related in general to the field of multimedia, more particularly, but not exclusively to method and system for generating video content based on user data.

BACKGROUND

In recent years, use of video and visual animation has become more popular due to the development of technologies and systems in area of computer science. From traditional television commercials to today's social networking sites, it's no secret that video has become a staple of our everyday lives. Particularly, visual representation of information is becoming increasingly common as it easier to grasp and more concise than reading text.

Conventionally, there are many systems and method for automatic conversion of user narration or text into video. However, existing systems do not ensure consistency between text input/narration throughout video creation. For instance, if a user selects a middle-aged man for character 'Tom' at start of the narration. After some scenes, user narrates that Tom says, "I will be on leave tomorrow to celebrate my 10th year birthday". The existing systems does not provide a method to identify such conflicts. Additionally, existing systems do not provide a provision to users for performing modification during generation of video. Also, a provision for checking character or contextual inconsistency at recent intervals is not supported in the existing systems. Therefore, there is a need for a system and method that can check for inconsistency at recent intervals during video creation and that can also support suitable modification to remove the inconsistency to ensure character and contextual consistency during video creation.

The information disclosed in this background of the disclosure section is only for enhancement of understanding of the general background of this technology and should not be taken as an acknowledgement or any form of suggestion that this information forms the prior art already known to a person skilled in the art.

SUMMARY

In an embodiment, the present disclosure may relate to a method for generating video content based on user data. The method comprises receiving user data sequentially from a user. Each sequence of the user data is converted into text data. The method comprises identifying one or more objects, relations, emotions, and actions from the user data by evaluating the text data, generating a scene descriptor for each sequence of the user data, by associating the one or more objects with at least the one or more relations, emotions and actions, performing a consistency check for the scene descriptor of each sequence of the user data, based on one or more previously stored scene descriptors associated with the user data, performing one or more modifications to one or more inconsistent scene descriptors, identified based on the consistency check, from the scene descriptor of each sequence of the user data, generating one or more video segments for each of the scene descriptor and generating video content for the user data by combining the one or more video segments associated with each of the scene descriptor.

In an embodiment, the present disclosure may relate to a video generation system for generating video content based on user data. The video generation system may comprise a processor and a memory communicatively coupled to the processor, where the memory stores processor executable instructions, which, on execution, may cause the video generation system to receive user data sequentially from a user. Each sequence of the user data is converted into text data. The video generation system identifies one or more objects, relations, emotions, and actions from the user data by evaluating the text data, generates a scene descriptor for each sequence of the user data, by associating the one or more objects with at least the one or more relations, emotions and actions, performs a consistency check for the scene descriptor of each sequence of the user data, based on one or more previously stored scene descriptors associated with the user data, performs one or more modifications to one or more inconsistent scene descriptors, identified based on the consistency check, from the scene descriptor of each sequence of the user data, generates one or more video segments for each of the scene descriptor and generates video content for the user data by combining the one or more video segments associated with each of the scene descriptor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
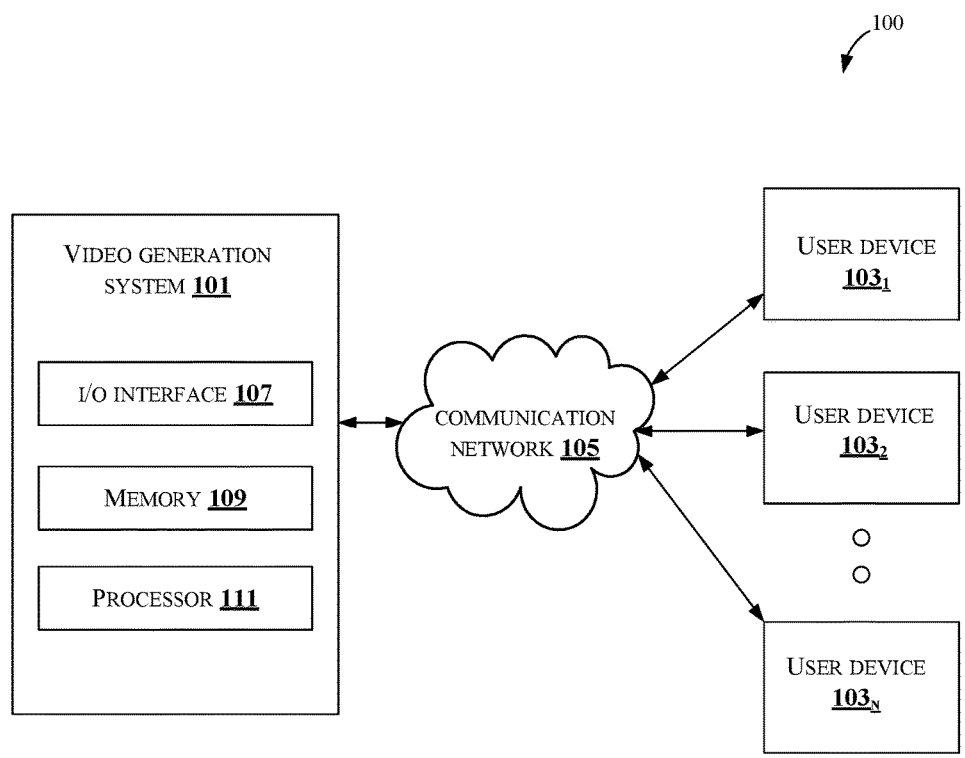
FIG. 1 illustrates an exemplary environment for generating video content based on user data in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a video generation system for generating video content based on user data. In an embodiment, the video generation system generates a video content which may preserve main idea of a given user data and is adapted to convey essence of the user data. According to the present disclosure, objects, relations, actions, and emotions may be identified from the user data which may be received sequentially from a user and converted to a text format. In an embodiment, the video generation system may generate the video content from at least one of recorded story and narration from the users, live narration from the users and text data provided by users in form of a conversation script. The objects identified in the user data are associated with the relations, actions, and emotions to generate a scene descriptor for each sequence of the user data. Thereafter, consistency check may be performed for identifying one or more inconsistent scene descriptors, based on previously defined scene descriptors. The one or more inconsistent scene descriptors may be modified based on the inconsistency identified. Further, one or more video content may be generated for each of the scene descriptors which may be combined to generate the video content for the user data. The present disclosure ensures consistency during video creation.

FIG.1 illustrates an exemplary environment for generating video content based on user data in accordance with some embodiments of the present disclosure.

As shown in FIG.1, the environment 100 comprises a video generation system 101 connected through a communication network 105 to a user device $103_1$, a user device $103_2$ and a user device $103_N$ (collectively referred as user devices 103) associated with users. In an embodiment, the user devices 103 may include, but are not limited to, a laptop, a desktop computer, a Personal Digital Assistant (PDA), a notebook, a smartphone, a tablet, a server, and any other computing devices. A person skilled in the art would understand that, any other devices, not mentioned explicitly, may also be used in the present disclosure. Further, the communication network 105 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The video generation system 101 generates video content based on user data provided by users. The video generation system 101 may receive user data from the user devices 103, whenever the users may wish to generate the video content. In an embodiment, the video generation system 101 may include, but is not limited to, a laptop, a desktop computer, a Personal Digital Assistant (PDA), a notebook, a smartphone, a tablet, a server and any other computing devices. A person skilled in the art would understand that, any other devices, not mentioned explicitly, may also be used as the video generation system 101 in the present disclosure. In an embodiment, the user data may be received from the users sequentially. In an embodiment, the user data may comprise recorded story and live narration from the users and text data in a form of a conversation script. In an embodiment, the user data may be associated with a historic story, a play, a tale, and any other data for which the users may require the video content. A person skilled in the art would understand that any other user data, not mentioned explicitly, may also be received in the present disclosure. The video generation system 101 may convert each sequence of the user data into text data. The video generation system 101 may evaluate the text data to identify one or more objects, relations, emotions, and actions from the user data. For instance, the one or more objects in the user data may include a user, a table, a wall, and the like. The video generation system 101 may generate a scene descriptor for each sequence of the user data, by associating the one or more objects with at least the one or more relations, emotions, and actions. In an embodiment, the scene descriptor is a metadata structure representing the one or more objects with associated attributes and association between the one or more objects with at least the one or more relations, actions, and emotions. In an embodiment, the scene descriptor may be generated using at least one of computer vision techniques and deep learning methods along with labelled training datasets. Further, the video generation system 101 may perform a consistency check for the scene descriptor of each sequence of the user data, based on one or more previously stored scene descriptors associated with the user data. Thereafter, the video generation system 101 may perform one or more modification to one or more inconsistent scene descriptors which may be identified based on the consistency check, from the scene descriptor of each sequence of the user data. In an embodiment, the one or more inconsistent scene descriptors may be identified on occurrence of one of, contextual inconsistency, a change in attributes associated with the one or more objects across different sequence of user data. The change in attributes may lead to difference between characters chosen by the user and narrated in the user data. In an embodiment, the one or more modifications comprises at least one of, changes to scene descriptor and changes to the one or more objects and actions based on the scene descriptor upon user consent. Further, the video generation system 101 may generate one or more video segments for each of the scene descriptor. In an embodiment, the video generation system 101 may provide an option to the users for editing the one or more video segments. In an embodiment, a user interface (not shown explicitly in FIG.1) may be provided to the users for editing the one or more video segments. For example, the users may edit the one or more video segments using a touch display panel. The video generation system 101 further generates the video content for the user data by combining the one or more video segments associated with each of the scene descriptor. In an embodiment, the video generation system 101 may provide audio settings to the generated video content based on user data. In an embodiment, the audio settings may be user defined or defined by the video generation system 101. In an embodiment, the audio setting may be converted in to conversation/direct speech with lip sync and appropriate context.

The video generation system 101 may include an I/O Interface 107, a memory 109 and a processor 111. The I/O interface 107 may be configured to receive the user data from the users. The I/O interface 107 may receive the one or more modifications provided by the users for modifying the inconsistent one or more scene descriptors.

The information received from the I/O interface 107 may be stored in the memory 109. The memory 109 may be communicatively coupled to the processor 111 of the video generation system 101. The memory 109 may also store processor instructions which may cause the processor 111 to execute the instructions for generating the video content based on the user data.

Figure 2:
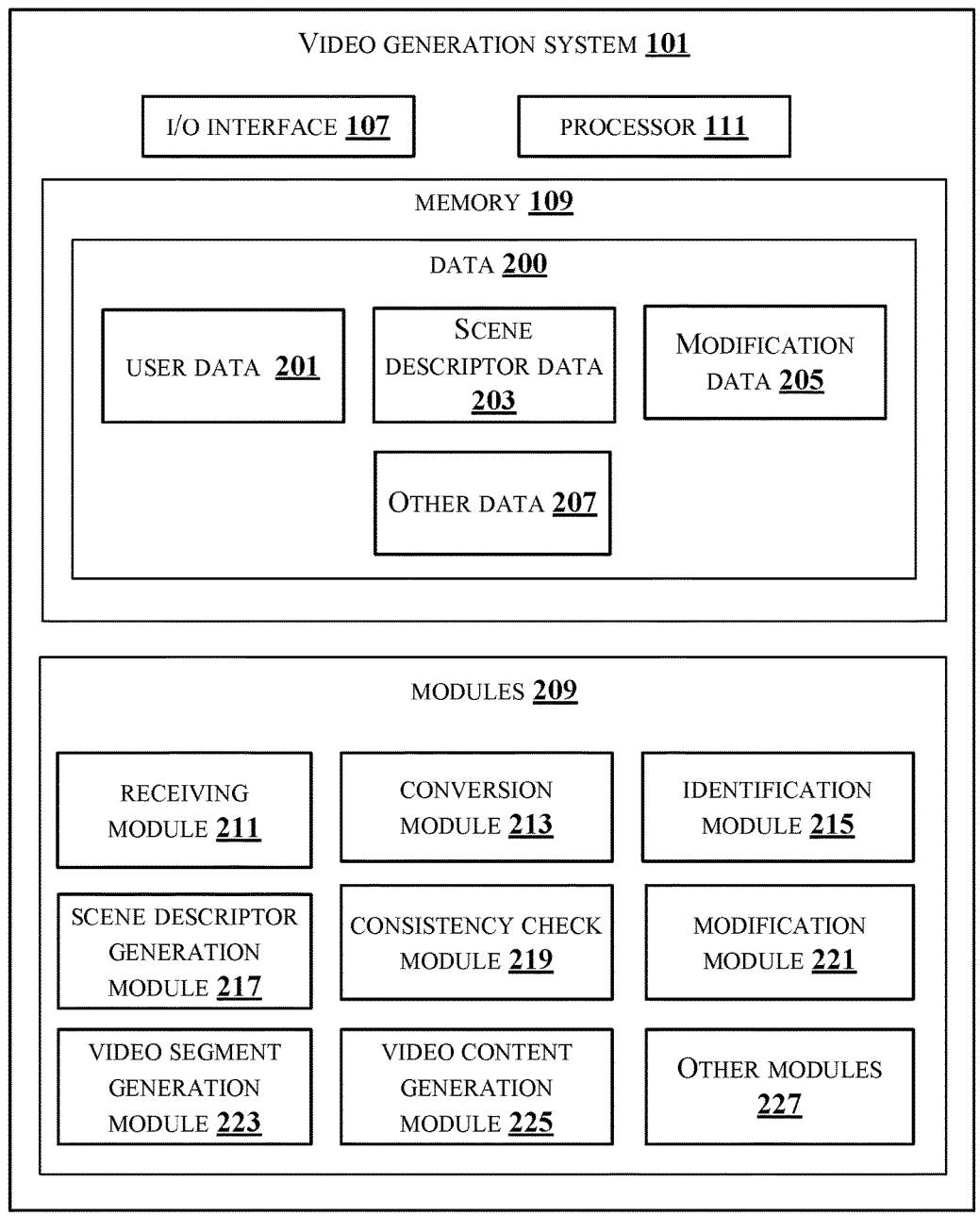
FIG. 2 shows a detailed block diagram of a video generation system in accordance with some embodiments of the present disclosure.

FIG. 2 shows a detailed block diagram of a video generation system in accordance with some embodiments of the present disclosure.

Data 200 and one or more modules 209 of the video generation system 101 are described herein in detail. In an embodiment, the data 200 may include user data 201, scene descriptor data 203, modification data 205 and other data 207.

The user data 201 may comprise inputs from the users for generating the video content. In an embodiment, the user data 201 indicates a scene or a story for which the video content is to be generated. The inputs from the users may comprise recorded story and narration, live narration from the user and text data in the form of conversation script. A person skilled in the art would understand that any other inputs from users, not mentioned explicitly, may also be used in the present disclosure. Further, the user data 201 may comprise details about the one or more objects, relations, emotions, and actions associated with the user data 201. For example, the user data 201 may comprise a live sequential narration of a story from a user, such as, "There was a lion in a forest". "It was sleeping under a tree near a pond". The narrated story comprises four objects, such as, "lion", "forest", "tree" and "pond". The one or more relations are identified for the pond and the tree as "near pond a tree", and "tree is near pond" respectively. The action associated with the object "lion" is identified as "sleeping under tree". Further, the conversation script may include, for example, "The Romeo: "oh! How do I scale the wall? I can see a window to the left".

The scene descriptor data 203 may comprise the scene descriptor generated for each sequence of the user data 201. In an embodiment, the scene descriptor is a metadata structure representing the one or more objects with associated attributes and association between the one or more objects with at least the one or more relations, actions, and emotions.

The modification data 205 may comprise details about the one or more inconsistent scene descriptors. The details may comprise list of the one or more inconsistent scene descriptors, type of inconsistency associated with the one or more inconsistent scene descriptors and one or more modifications to be performed to remove the inconsistency from the one or more inconsistent scene descriptors. In an embodiment, the one or more modifications may comprise at least one of, changes to scene descriptor and changes to the one or more objects and actions based on the scene descriptors upon receiving user consent.

The other data 207 may store data, including temporary data and temporary files, generated by modules 209 for performing the various functions of the video generation system 101.

In an embodiment, the data 200 in the memory 109 are processed by the one or more modules 209 of the video generation system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 209 when configured with the functionality defined in the present disclosure will result in a novel hardware.

In one implementation, the one or more modules 209 may include, but are not limited to a receiving module 211, a conversion module 213, an identification module 215, a scene descriptor generation module 217, a consistency check module 219, a modification module 221, a video segment generation module 223 and a video content generation module 225. The one or more modules 209 may also include other modules 227 to perform various miscellaneous functionalities of the video generation system 101. In an embodiment, the other modules 227 may include an audio setting module for assembling the generated video content with a specific audio based on user choice.

The receiving module 211 may receive the user data from the user devices 103. The user data may be received sequentially from the users of the user devices 103 in speech format. In an embodiment, the user data comprises recorded story and narration, live narration from the user and text data in form of the conversation script. Further, the receiving module 211 may receive the video content generated from the user data.

The conversion module 213 may convert the user data received from the user devices 103 into text data. In an embodiment, the conversion module 213 may convert the user data using semantic analysis technique. A person skilled in the art would understand that any other technique, not mentioned explicitly, may also be used in the present disclosure.

The identification module 215 may identify the one or more objects, attributes of the objects, actions, emotions, and relations from the user data by evaluating the text data. In an embodiment, the identification module 215 may utilize Long Short Term Memory (LSTM) network technique to evaluate the text data.

The scene descriptor generation module 217 may generate the scene descriptor for each sequence of the user data by associating the one or more objects with at least the one or more relations, emotions and actions. In an embodiment, the scene descriptor is the metadata structure representing the one or more objects with associated attributes and association between the one or more objects with at least the one or more relations, actions, and emotions. In an embodiment, the scene descriptor generation module 217 may use computer vision technique and deep learning technique along with labelled training datasets to generate the scene descriptor for each sequence of the user data. A person skilled in the art would understand that any other technique, not mentioned explicitly, may also be used in the present disclosure.

The consistency check module 219 may perform the consistency check for the scene descriptor of each sequence of the user data, based on one or more previously stored scene descriptors associated with the user data. The consistency check module 219 may identify one or more inconsistent scene descriptors during the consistency check. The consistency check module 219 may perform the consistency check by analyzing the previously stored one or more scene descriptors associated with the user data, with the one or more objects relations, actions and emotions identified from the succeeding user data. In an embodiment, the succeeding user data may traverse the one or more previously stored scene descriptors, once one or more objects are identified after parsing the one or more objects relations, actions, and emotions of the succeeding user data. Further, the consistency check module 219 may identify any mismatch between the one or more previously stored scene descriptors and the succeeding user data during parsing. In an embodiment, the mismatch or confusion may trigger for a conversation with the users for clarification. Thereafter, the consistency check module 219 may identify the one or more inconsistent scene descriptors. In an embodiment, the inconsistency in the scene descriptor may be based on occurrence of one of, the change in attributes associated with the one or more objects across different sequence of the user data leading to difference between characters chosen by the user and narrated in the user data. For example, a user chose a middle-aged man for character of Tom. After some scenes, Tom says "I will be on leave tomorrow to celebrate my 10th year birthday". Further, the inconsistency may be due to contextual inconsistency. For example, Abraham Lincoln shaking hands with Obama.

The modification module 221 may perform one or more modifications to the one or more inconsistent scene descriptors to maintain consistency during generation of each scene descriptor. In an embodiment, the one or more modifications may be system defined or user defined. In an embodiment, the users may be provided with the option for performing the one or more modifications to the one or more inconsistent scene descriptors. In an embodiment, the one or more modifications may comprise at least one of, changes to scene descriptor and changes to the one or more objects and actions based on the scene descriptor upon user consent.

The video segment generation module 223 may generate the one or more video segments for each of the scene descriptor. In an embodiment, the users may be provided with the option of editing the one or more video segments. For example, a user narrates that a parrot was sitting on a mango tree. The video segment generation module 223 may a video segment based on training data. The user may manipulate the video segment based on requirement.

The video content generation module 225 may generate the video content for the user data by combining the one or more video segments associated with each of the scene descriptor. In an embodiment, the video content generation module 225 may combine the one or more video segments with corresponding audio settings to form the video content. In an embodiment, the audio settings may be user defined or system defined.

Figure 3A:
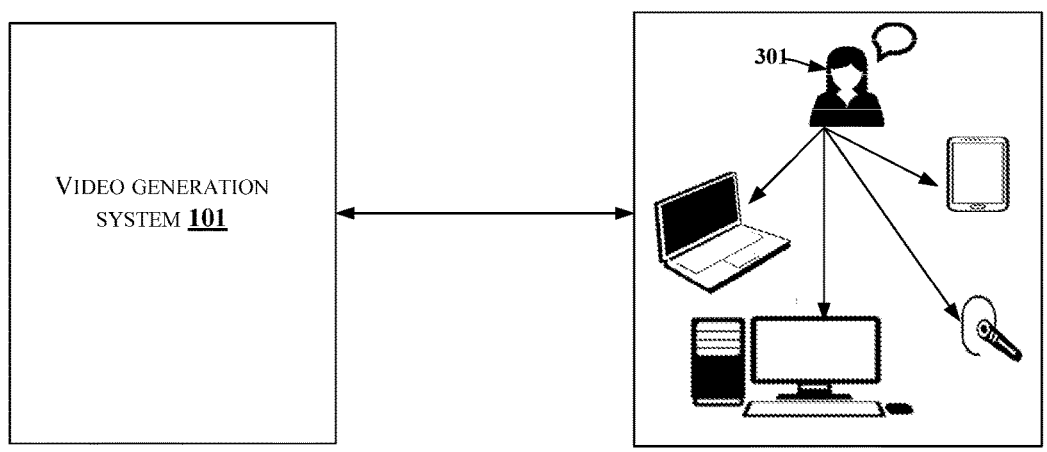
FIG. 3a, FIG. 3b and FIG. 3c show exemplary representations of generating video content based on user data in accordance with some embodiments of the present disclosure.
Figure 3B:
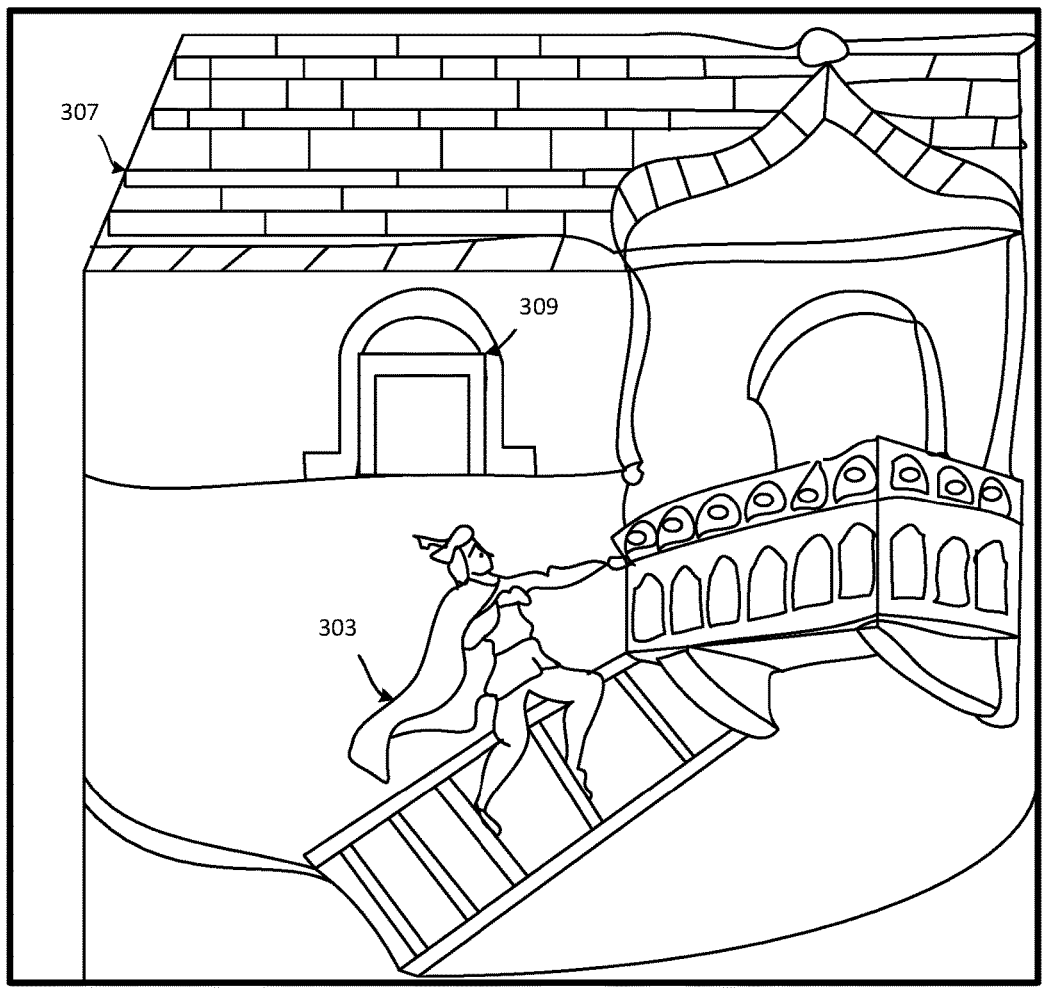
Figure 3C:
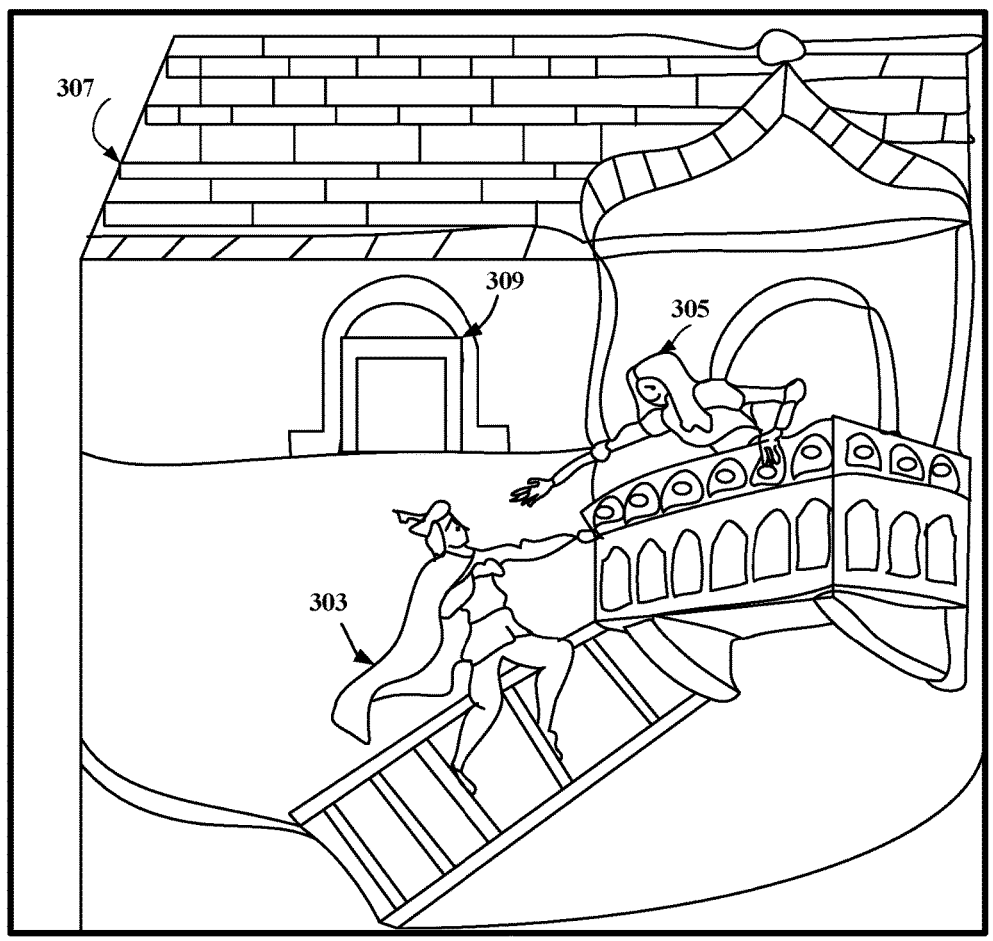

FIG. 3*a*, FIG. 3*b* and FIG. 3*c* show exemplary representations of generating video content based on user data in accordance with some embodiments of the present disclosure.

FIG. 3*a* illustrates an exemplary embodiment of generating the video content. The exemplary embodiment comprises the video generation system 101 connected to the user devices 103, where a user 301 may narrate the user data using any of the user devices 103. For instance, consider that the user 301 is narrating a story of Romeo and Juliet using a microphone device connected to the video generation system 101 as shown in FIG. 3*a*. In an embodiment, one instance of the Romeo Juliet story is used for generation the video content. t. The user 301 narrates the story sequentially. For instance, in the first instance, the user 301 narrates that "Romeo was scaling wall of Juliet house. There was a window to the left of Romeo". The video generation system 101, may receive the user input from the user 301 as live speech and converts the speech to text data. The video generation system 101 may evaluate the text data and may identify the one or more objects, relations, action, and emotions from the text data. For example, from the user data, the extracted one or more objects are house of Juliet and Romeo. In an embodiment, a sub object of the house of Juliet is identified as the window. Further, the video generation system 101 may generate the scene descriptor for the user data by associating the one or more objects with the relation, action, and emotion. In an embodiment, for each of the one or more objects, one or more attributes may be assigned. For example, in the user data, the objects are house of Juliet and Romeo. The attributes for the house of Juliet may be number of windows, position of windows, look of Juliet house etc. For example, the number of windows is identified as, at least one, position of windows is identified as left and look of house is of Juliet house. For the Romeo, the attributes may be face, age, built etc. Further, the actions may be identified as, scaling of wall, where the performer is Romeo. In an embodiment, if house of Juliet is referenced for the first time, any house with description such as, at least one window to the left may be used from one of stored images, user provided images or from any other sources. The video generation system 101 may perform the consistency check for the scene descriptor based on one or more previously stored scene descriptors. At this instance, the consistency check may be performed between scenes generated up to this point. For example, according to the user data, there is a window to the left of Romeo. The video generation system 101 may perform the consistency check and may identify one or more inconsistent scene descriptors based on previously stored scene descriptors. For example, inconsistencies may arise due to a variety of reasons such as, there is a window to the right or there is no window in the house. Further, instead of the window in the left, there is a window to the right. Inconsistencies as, no window to the left of the scene may be used in the past before this scene, Juliet's house chosen in the present scene and in past scenes are different. Further, inconsistencies may arise if Romeo's face or look is different in present scene compared to the past scene. In an embodiment, changes in the one or more actions may not be perceived as inconsistency. For example, in the present sequence of user data, the Romeo scales the wall. In another sequence of the user data, Romeo may be fighting. However, Juliet's house is expected to look the same way throughout the scene, unless the change is also a part of the user data. For example, Juliet got a new window created to the right. Further, the data generation system 101 may perform one or more modifications to the one or more inconsistent scene descriptors. For instance, consider there was no window to the left in the previous scenes narrated by the user 301. In such case, the video generation system 101 may perform the modification in the previously stored scene descriptors by embedding a window to the left in all the previous scenes based on consent of the user 301. Once the one or more modifications are performed, the video generation system 101 may generate one or more video segments for the user data. In the present case, Romeo scaling the wall of Juliet's house may be generated as the video segment as shown in FIG. 3b. In an embodiment, the video generation system 101 may fetch a scene, where a person is scaling a wall, from stored database of actions or from other sources and replacing the person and wall by Romeo and Juliet's house. Alternatively, the user 301 may provide an image of Romeo scaling the wall. Further, the video generation system 101 may combine the one or more segments to generate the video content. In the present case, the video generation system 101 may combine the video segment of Romeo scaling the wall of Juliet house with a video segment of Juliet standing in balcony. The video segment of Juliet standing in the balcony may be generated previously based on user data. The video generation system 101 may extract the video segment of Juliet standing in the balcony and combine with the video segment of Romeo scaling the wall of Juliet house to generate the video content for the user data. FIG. 3c show exemplary representation of the generated video content. As shown, Romeo 303, Juliet 305, house of Juliet 307 and window 309 at left are shown.

Figure 4:
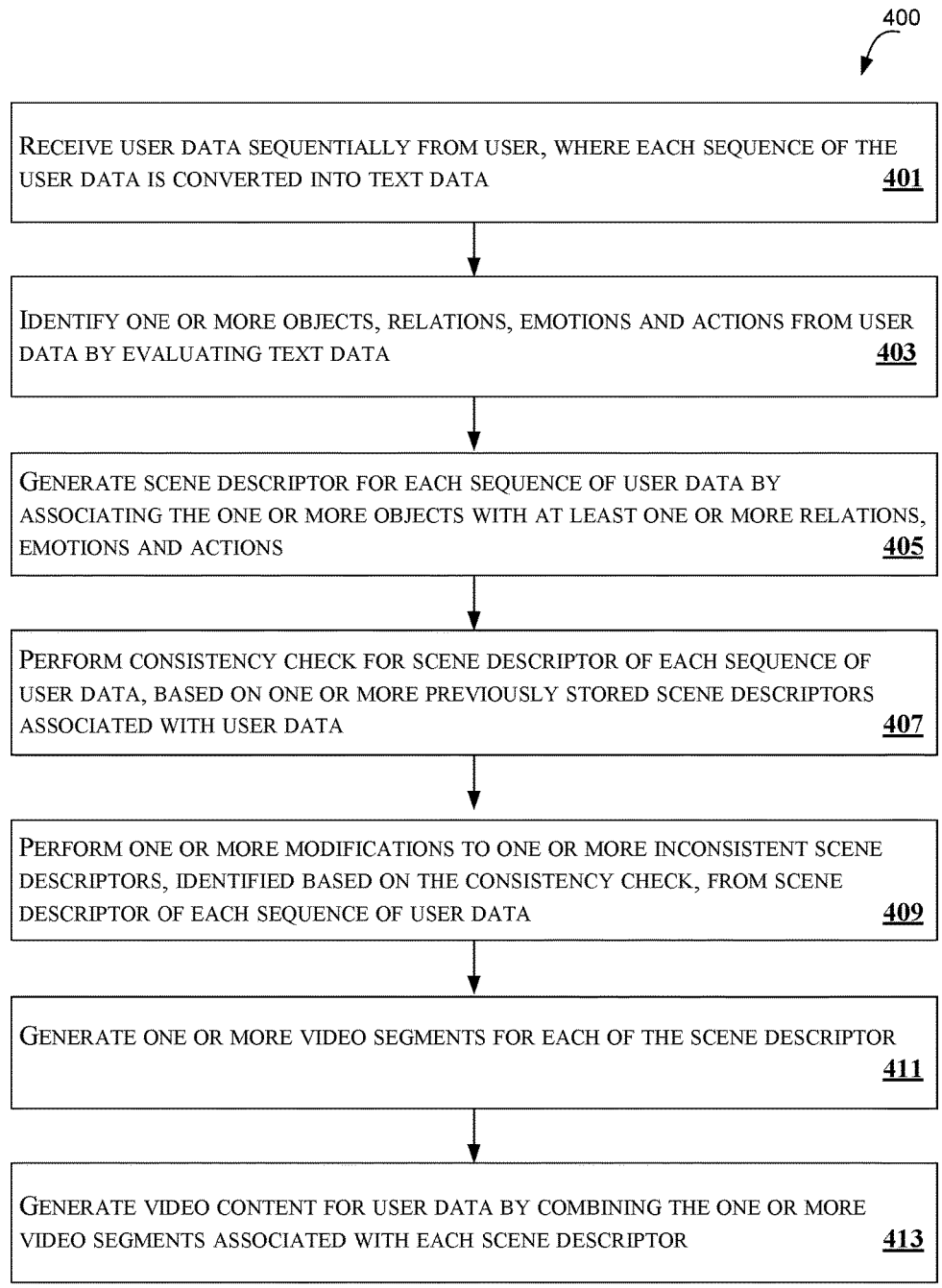
FIG. 4 illustrates a flowchart showing a method for generating video content based on user data in accordance with some embodiments of present disclosure.

FIG. 4 illustrates a flowchart showing a method for generating video content based on user data in accordance with some embodiments of present disclosure.

As illustrated in FIG. 4, the method 400 includes one or more blocks for generating video content based on user data. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof At block 401, the user data 201 may be received sequentially from the user by a receiving module 211. Each sequence of the user data 201 may be converted into text data by the conversion module 213.

At block 403, the one or more objects, relations, emotions, and actions may be identified by the identification module 215 from the user data 201 by evaluating the text data.

At block 405, the scene descriptor for each sequence of the user data 201 is generated, by the scene descriptor generation module 217, by associating the one or more objects with at least the one or more relations, emotions, and actions.

At block 407, the consistency check may be performed by the consistency check performing module 219, for the scene descriptor of each sequence of the user data 201, based on one or more previously stored scene descriptors associated with the user data 201.

At block 409, the one or more modifications to one or more inconsistent scene descriptors may be performed by the modification performing module 221, identified based on the consistency check, from the scene descriptor of each sequence of the user data 201.

At block 411, the one or more video segments may be generated by the video segment generation module 223, for each of the scene descriptor.

At block 413, the video content for the user data 201 may be generated by the video content generation module 225, by combining the one or more video segments associated with each of the scene descriptor.

Computing System

Figure 5:
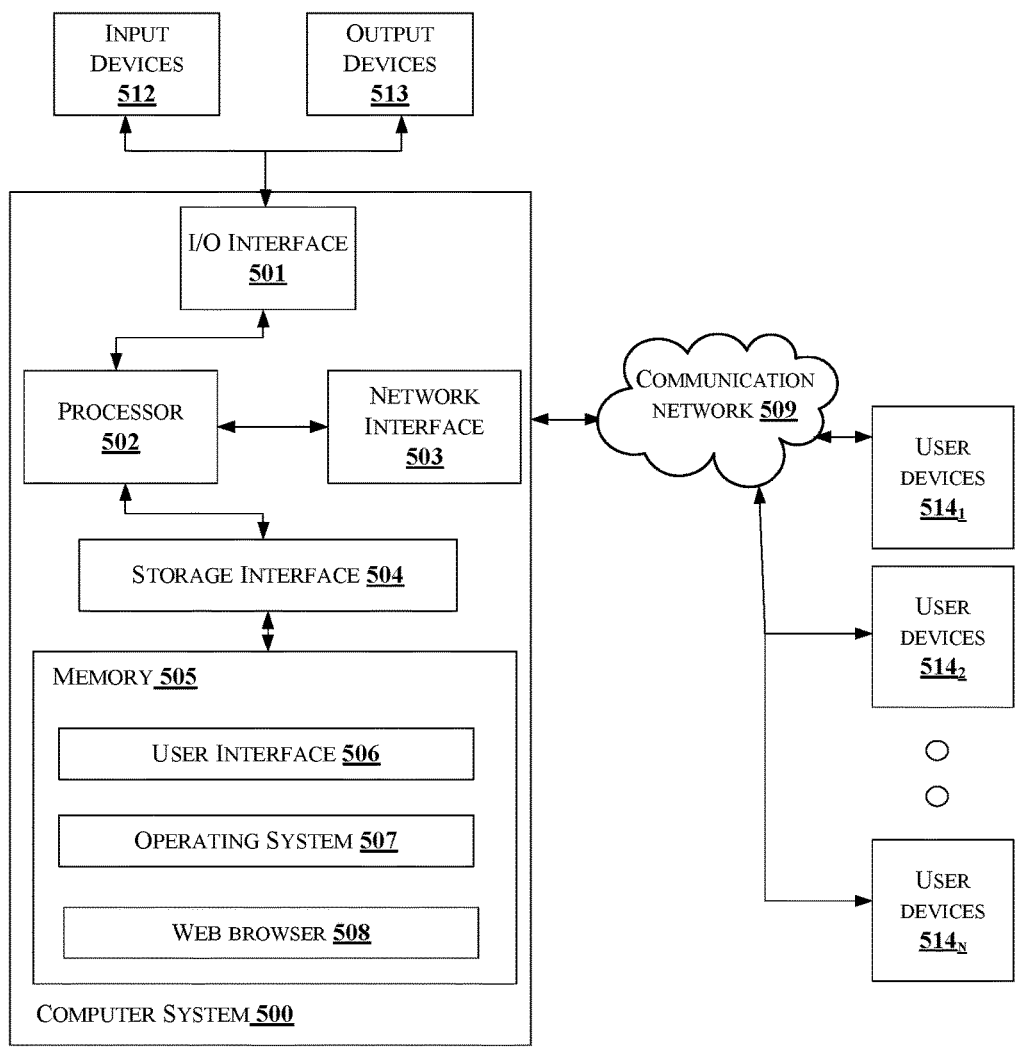
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the video generation system 101. The computer system 500 may include a central processing unit ("CPU" or "processor") 502. The processor 502 may include at least one data processor for generating video content based on user data. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of the video generation system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user device $514_1$, a user device $514_2$ and a user device $514_N$. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure maintains consistency during video creation.

An embodiment of the present disclosure provides a user interface to allow modification during narration.

An embodiment of the present disclosure provides multiple versions of video content for same story based on user requirement.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of this technology.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the technology need not include the device itself The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the technology is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating video content based on user data, the method implemented by one or more video generation computing devices and comprising:
receiving user data sequentially from a user, wherein each of a plurality of sequences of the user data is converted into text data;
identifying one or more objects, relations, emotions, and actions from the user data by evaluating the text data;
generating a scene descriptor for each of the sequences of the user data, by associating the one or more objects with at least the one or more relations, emotions, and actions;
performing a consistency check for the scene descriptors based on one or more previously stored scene descriptors associated with the user data;
performing one or more modifications to one or more inconsistent scene descriptors, identified based on the consistency check, from the scene descriptors;
generating one or more video segments for each of the scene descriptors; and
generating video content for the user data by combining the one or more video segments associated with each of the scene descriptors.

2. The method as claimed in claim 1, wherein the user data comprises one of more of recorded story and narration, live narration from the user, or text data in the form of a conversation script.

3. The method as claimed in claim 1, wherein one or more of the scene descriptors is a metadata structure representing the one or more objects with associated attributes and association between the one or more objects with at least the one or more relations, actions, and emotions.

4. The method as claimed in claim 1, wherein the inconsistency in the scene descriptor is identified based on occurrence of one of a change in attributes associated with the one or more objects across different sequences of user data leading to a difference between characters chosen by the user and narrated in the user data or contextual inconsistency.

5. The method as claimed in claim 1, wherein the one or more modifications comprise at least one of one or more changes to one or more of the scene descriptors or one or more changes to the one or more objects or actions based on the scene descriptors upon user consent.

6. The method as claimed in claim 1 further comprising providing one or more of an option of editing the one or more video segments to the user or one or more audio settings to the generated video content based on user data.

7. A video generation computing device comprising memory comprising programmed instructions stored thereon and a processor configured to be capable of executing the stored programmed instructions to:
receive user data sequentially from a user, wherein each of a plurality of sequences of the user data is converted into text data;
identify one or more objects, relations, emotions, and actions from the user data by evaluating the text data;
generate a scene descriptor for each of the sequences of the user data, by associating the one or more objects with at least the one or more relations, emotions, and actions;
perform a consistency check for the scene descriptors based on one or more previously stored scene descriptors associated with the user data;
perform one or more modifications to one or more inconsistent scene descriptors, identified based on the consistency check, from the scene descriptors;
generate one or more video segments for each of the scene descriptors; and
generate video content for the user data by combining the one or more video segments associated with each of the scene descriptors.

8. The video generation computing device of claim 7, wherein the user data comprises one of more of recorded story and narration, live narration from the user, or text data in the form of a conversation script.

9. The video generation computing device of claim 7, wherein one or more of the scene descriptors is a metadata structure representing the one or more objects with associated attributes and association between the one or more objects with at least the one or more relations, actions, and emotions.

10. The video generation computing device of claim 7, wherein the inconsistency in the scene descriptor is identified based on occurrence of one of a change in attributes associated with the one or more objects across different sequences of user data leading to a difference between characters chosen by the user and narrated in the user data or contextual inconsistency.

11. The video generation computing device of claim 7, wherein the one or more modifications comprise at least one of one or more changes to one or more of the scene descriptors or one or more changes to the one or more objects or actions based on the scene descriptors upon user consent.

12. The video generation computing device of claim 7, wherein the processor is further configured to be capable of executing the stored programmed instructions to provide one or more of an option of editing the one or more video segments to the user or one or more audio settings to the generated video content based on user data.

13. A non-transitory computer readable medium having stored thereon instructions for generating video content based on user data comprising executable code which when executed by one or more processors, causes the processors to:
   receive user data sequentially from a user, wherein each of a plurality of sequences of the user data is converted into text data;
   identify one or more objects, relations, emotions, and actions from the user data by evaluating the text data;
   generate a scene descriptor for each of the sequences of the user data, by associating the one or more objects with at least the one or more relations, emotions, and actions;
   perform a consistency check for the scene descriptors based on one or more previously stored scene descriptors associated with the user data;
   perform one or more modifications to one or more inconsistent scene descriptors, identified based on the consistency check, from the scene descriptors;
   generate one or more video segments for each of the scene descriptors; and
   generate video content for the user data by combining the one or more video segments associated with each of the scene descriptors.

14. The non-transitory computer readable medium of claim 13, wherein the user data comprises one of more of recorded story and narration, live narration from the user, or text data in the form of a conversation script.

15. The non-transitory computer readable medium of claim 13, wherein one or more of the scene descriptors is a metadata structure representing the one or more objects with associated attributes and association between the one or more objects with at least the one or more relations, actions, and emotions.

16. The non-transitory computer readable medium of claim 13, wherein the inconsistency in the scene descriptor is identified based on occurrence of one of a change in attributes associated with the one or more objects across different sequences of user data leading to a difference between characters chosen by the user and narrated in the user data or contextual inconsistency.

17. The non-transitory computer readable medium of claim 13, wherein the one or more modifications comprise at least one of one or more changes to one or more of the scene descriptors or one or more changes to the one or more objects or actions based on the scene descriptors upon user consent.

18. The non-transitory computer readable medium of claim 13, wherein the executable code when executed by the processors further causes the processors to provide one or more of an option of editing the one or more video segments to the user or one or more audio settings to the generated video content based on user data.

* * * * *